(12) United States Patent
Shahkarami

(10) Patent No.: US 7,494,219 B2
(45) Date of Patent: *Feb. 24, 2009

(54) EYEWEAR FOR REDIRECTED VIEWING WITH AUXILIARY LENSES

(76) Inventor: Bahman Shahkarami, 6410 Emerald Greet Ct., Centreville, VA (US) 20121

( * ) Notice: Subject to any disclaimer, the term of this patent is extended or adjusted under 35 U.S.C. 154(b) by 0 days.

This patent is subject to a terminal disclaimer.

(21) Appl. No.: 12/019,885

(22) Filed: Jan. 25, 2008

(65) Prior Publication Data

US 2008/0259270 A1    Oct. 23, 2008

Related U.S. Application Data

(63) Continuation-in-part of application No. 11/738,398, filed on Apr. 20, 2007.

(51) Int. Cl.
  *G02C 1/00* (2006.01)
(52) U.S. Cl. .................................................... 351/158
(58) Field of Classification Search ................ 351/158, 351/41, 57, 58, 59, 170, 175; 2/428; 359/480
  See application file for complete search history.

(56) References Cited

U.S. PATENT DOCUMENTS

| | | | |
|---|---|---|---|
| 2,123,682 A | 7/1938 | Wingate | |
| D161,885 S | 2/1951 | Warner | |
| 2,594,698 A | * | 4/1952 | Thomas ............ 359/480 |
| 4,077,703 A | 3/1978 | Pablo | |
| 4,647,165 A | 3/1987 | Lewis | |
| 4,792,223 A | 12/1988 | Axelbaum | |
| 4,804,261 A | 2/1989 | Kirschen | |
| 5,042,910 A | 8/1991 | Dolezal | |
| 5,173,720 A | 12/1992 | Lee et al. | |
| 6,006,367 A | 12/1999 | Webster | |
| 6,280,031 B1 | 8/2001 | Zerkle | |

* cited by examiner

*Primary Examiner*—Hung X Dang
(74) *Attorney, Agent, or Firm*—The Marbury Law Group, PLLC

(57) ABSTRACT

A pair of spectacles for providing a redirected view includes a visor configured to support a pair of triangular optical prisms attached to the bottom surface of the visor in front of a wearer's eyes. The prisms provide an internally reflected and refracted path approximately normal to the forward vision allowing the wearer to view scenes without head or body reorientation. The visor and the prisms are oriented at an angle of 5 to 15 degrees below horizontal, as defined by the spectacles' handle portion, to position the prisms at an optimal viewing angle to enhance wearer comfort. The prisms are made wide and spaced close together to provide a panoramic perspective, with the inside lower corner radiused to provide room for a wearer's nose. Tinted and/or corrective lenses are removeably coupled to the spectacles so the lenses are in the vision path through the prisms.

9 Claims, 15 Drawing Sheets

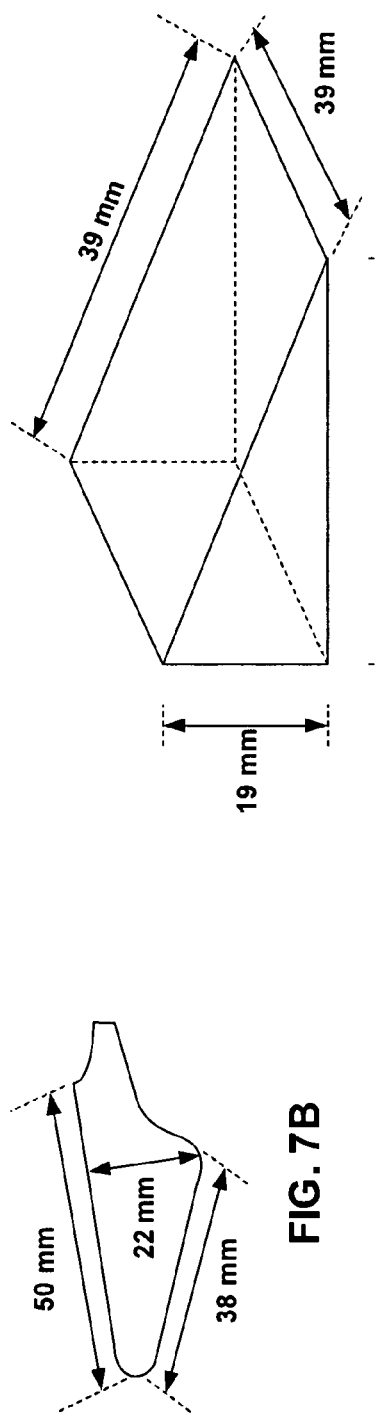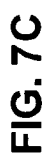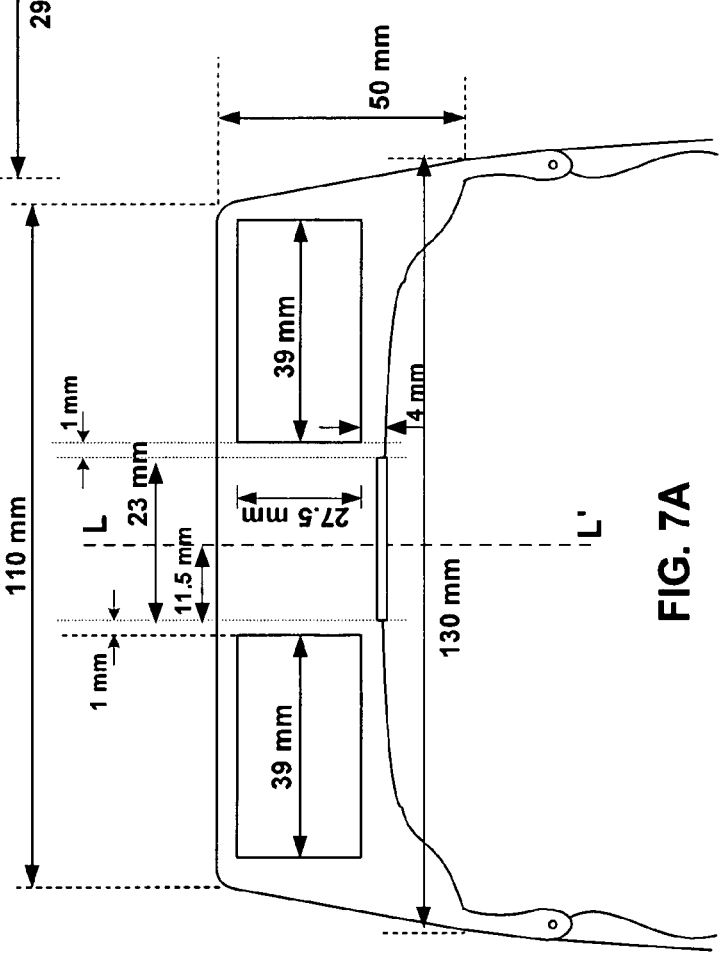

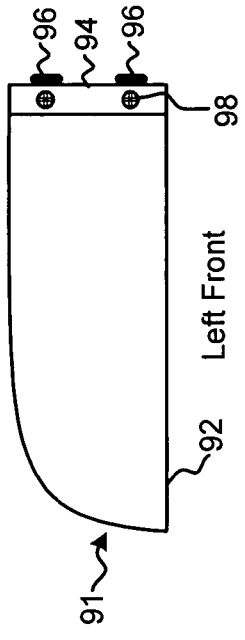
FIG. 10B Left Front
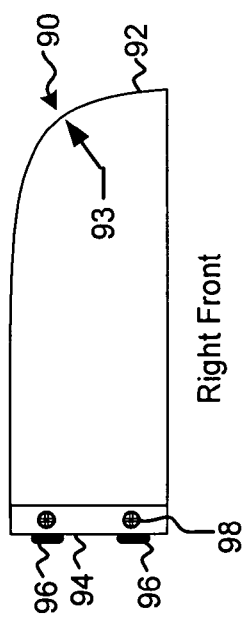
FIG. 10A Right Front
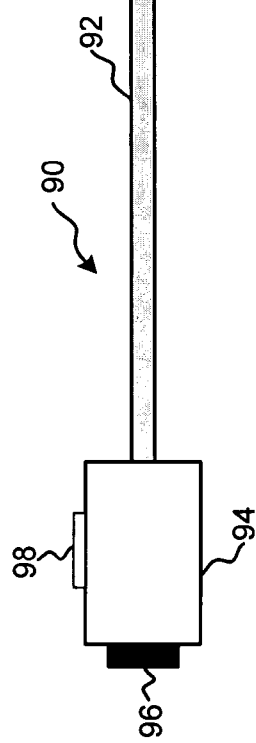
FIG. 10C
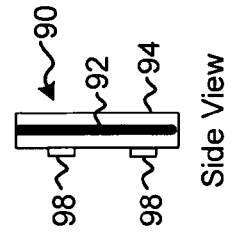
FIG. 10E Side View
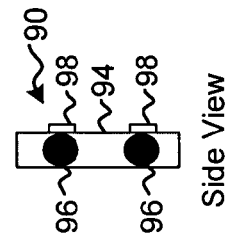
FIG. 10D Side View

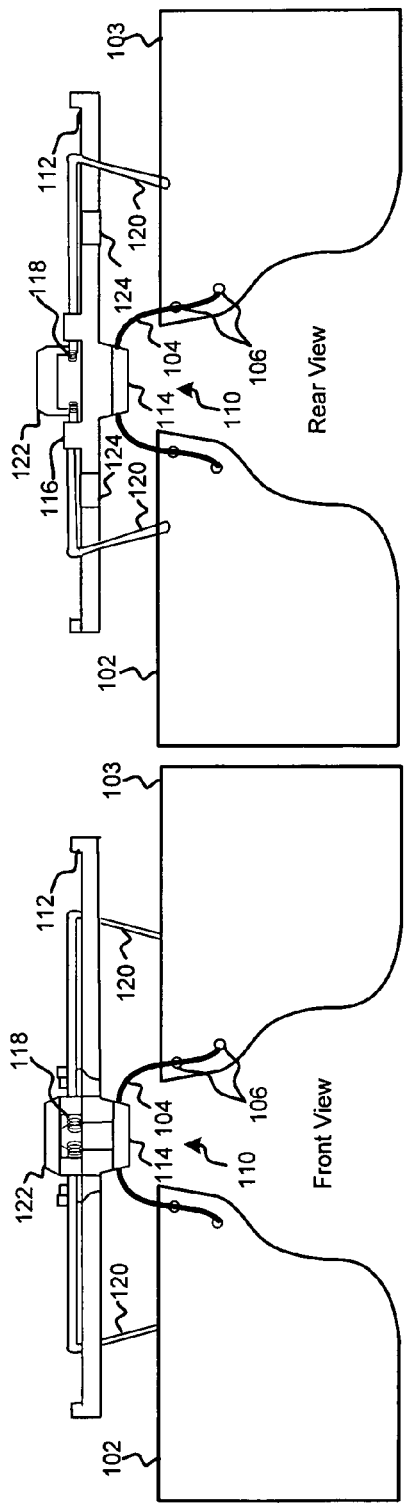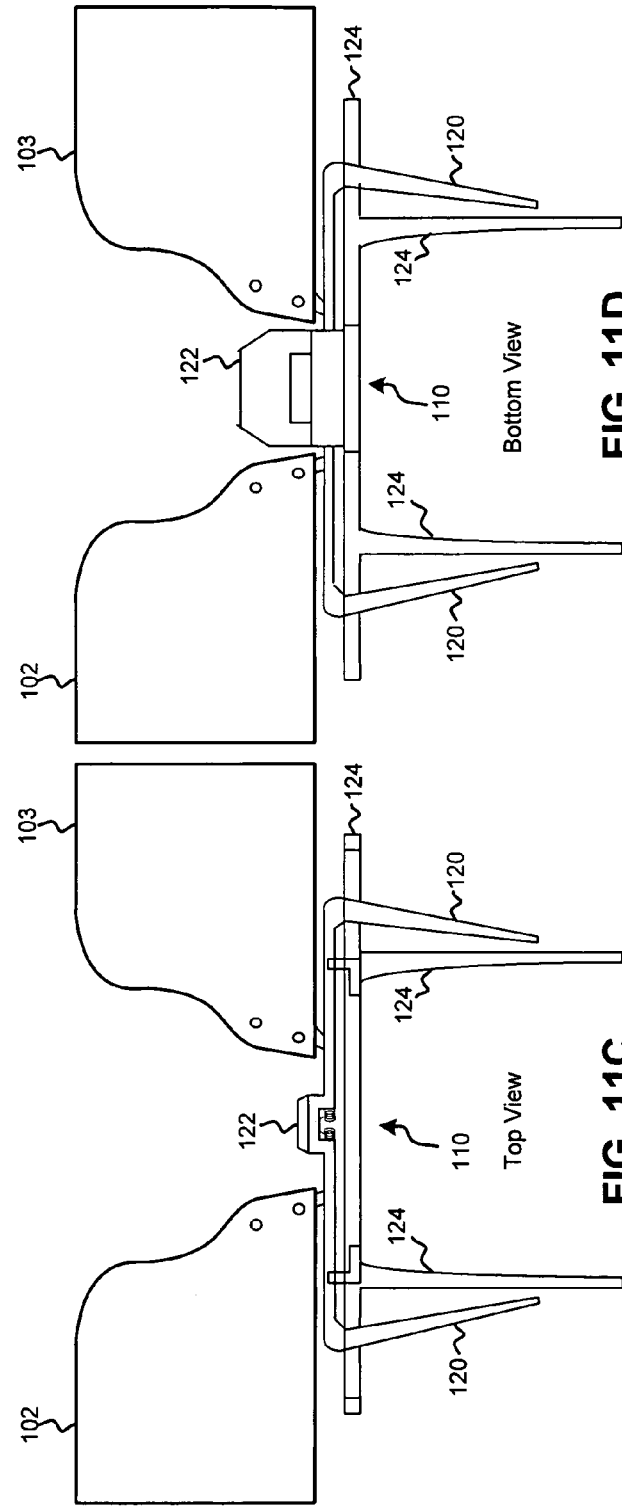

EYEWEAR FOR REDIRECTED VIEWING WITH AUXILIARY LENSES

RELATED APPLICATIONS

This application is a continuation-in-part of U.S. patent application Ser. No. 11/738,398 entitled "Eyewear for Redirected Viewing" filed Apr. 20, 2007, the entire contents of which are hereby incorporated by reference.

FIELD OF THE INVENTION

This invention relates to optical appliances, and more particularly to eyewear for redirecting the vision of a wearer.

BACKGROUND OF THE INVENTION

Optical devices for redirecting fields of view have been proposed for varying applications to enable a wearer to view a scene offset from the normal line of sight. With such devices, the wearer is able to secure desired views without changing body and head positions and/or by superimposing backgrounds for facilitating or ameliorating certain conditions.

In U.S. Pat. No. 5,042,910 to Dolezal a removable elongated plastic prism is interfaced with a slotted shield for redirecting the field of vision of the wearer. The shield and associated frame are intended for blocking all images not passing through the prismatic lenses.

U.S. Pat. No. 4,804,261 to Kirschen discloses a rearward mirrored viewing system for patients prone to claustrophobia. Therein a mirror mounted on frames provides a rearwardly directed, background view at the end of a magnetic resonance instrument thereby providing an artificial backdrop removing the tunnel like aspects and resulting claustrophobia associated with the examination.

U.S. Pat. No. 4,647,165 to Lewis provides an optical viewing system for bike riders wherein prisms are attached to clip-on spectacle frames and pivot downward to an operative position engaging the lens when the riders head is lowered thereby providing a redirected view forwardly of the bike.

U.S. Pat. No. 4,792,223 to Axelbaum discloses an optical device incorporated into eyewear frames wherein a lower mirrored secondary lens supported in front of and inclined with respect to a primary lens is effective for providing a secondary field of view that is superimposed on a primary field of view.

U.S. Pat. No. 6,006,367 to Webster discloses swimming goggles incorporating a prismed element allowing a wearer through eye redirection to achieve a secondary field of vision.

U.S. Pat. No. 5,173,720 to Lee et al. discloses a specialty eyewear device including a slotted frame having mirrored surfaces angularly disposed with respect thereto. The wearer may view forwardly through the slots for normal straight ahead viewing. Alternatively, the wearer may view downwardly through the slots to achieve a redirected view as affected by the mirrored surfaces.

U.S. Pat. No. 4,077,703 to Pablo discloses an eye frame incorporating prisms housed in an elongated frame overlying the wearer's face and disposed in front of the view's eyes for redirecting normal line of sight for reading or viewing.

U.S. Pat. No. 2,123,682 to Wingate discloses laterally slidable prisms mounted in eyewear frames for redirecting normal vision angles. The frames and peripheral shrouds for the prisms surround the prisms thereby effectively limiting frontal viewing to the prismed areas and to the exclusion of surrounding peripheral information.

U.S. Pat. No. 6,280,031 to Zerkle discloses prisms mounted in eyewear frames for redirecting normal vision angles with frames and lenses constructed so as to not block the peripheral vision of the wearer.

SUMMARY OF THE INVENTION

The various embodiments provide supplemental tinted and/or corrected lenses that work in conjunction with optical spectacles that provide a redirected view. A visor configured to be positioned on the wearer at the brow line supports a pair of triangular optical prisms attached to the bottom surface of the visor in front of the wearer's eyes. The prisms provide an internally reflected and refracted path normal to the forward vision allowing the wearer to view scenes without head or body reorientation, such as watching television from a supine position. The visor, and thus the prisms, are oriented at an angle of 5 to 15 degrees below horizontal, as defined by the spectacles' handle portion, to position the prisms at an optimal viewing angle to enhance wearer comfort. The visor is shaped for a comfortable fit on the human forehead. The size, width and the shape of this visor makes for an easy universal fit on the brow line of various shapes and sizes of foreheads. The prisms are wide to enhance viewing so the wearer can easily see the desired scene without having to hunt for the view or ignore other images in the wearer's field of vision. To ensure the prisms do not press upon the nose of the wearer, the lower, inner corner of each prism is provided with a radius. A soft rubber pad at the center of the visor evenly distributes the weight of the spectacles on the forehead to prevent discomfort due to weight. In addition, the pad lifts the visor and the prisms away from the brow line allowing for the spectacles to lay over most conventional prescription or sun glasses eyewear. A visor side protection shaped to match the sides of the prism prevents light from entering the triangular prisms from the outer sides thereby preventing distortion or false images due to light absorption, refraction and/or reflection from the sides. The side protection also serves to protect the prisms from side damage. A coding applied to the parallel end wall of the triangular prisms further prevents light from entering the prisms from the inner sides. Tinted and/or corrective lenses are configured to be removably attached to the spectacles visor or the prisms in order to improve a wearer's vision and experience and obviate a need to wear the spectacles over other eyewear. Lenses may be attached to the spectacles by fitting within a grooved slot in the visor side panel, magnetically attaching to the visor side panel or clipping to the visor bill. Alternatively, lenses may be configured with spring-loaded tabs which fit over a prism.

DESCRIPTION OF THE DRAWINGS

The benefits of the present invention will become apparent upon reading the following detailed description taken in conjunction with the accompanying drawings.

FIGS. 7A-7C show the spectacles with representative dimensions identified.

FIGS. 10A-10F are perspective views of another embodiment of tinted and/or corrective lenses for use with the spectacles.

FIGS. 11A-11G are perspective views of another embodiment of tinted and/or corrective lenses for use with the spectacles.

DETAILED DESCRIPTION

This invention provides eyewear in the form of a pair of spectacles that enables the wearer to view objects situated at a considerable angle (60 to 120 degrees) to the direct line of vision with comfort and without distraction. This invention can be used, for example, for watching TV while laying on one's back looking toward the ceiling.

Embodiments of the present invention will be described in detail with reference to the accompanying drawings. Wherever possible, the same reference labels will be used throughout the drawings to refer to the same or like parts.

Referring to FIGS. 1-5, the eyewear in the form of prismatic optical spectacles S are configured so that when worn by a wearer or user U, the wearer experiences a redirected line of sight DE from a normal forward viewing path D'E'. Such redirected viewing allows the wearer to engage in various viewing activities otherwise requiring extensive body, neck or head repositioning.

Figure 2:
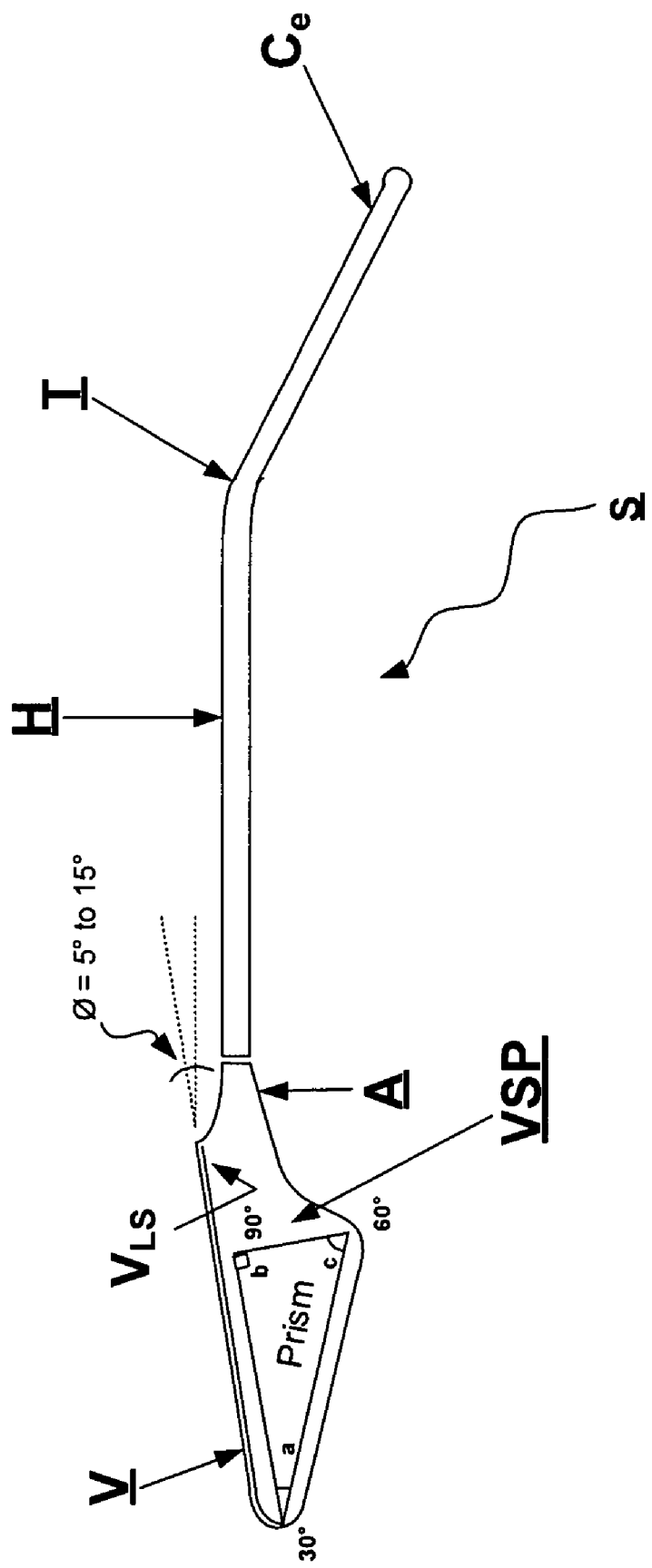
FIG. 2 is a side cross sectional view taken along line LL' in FIG. 1.

The spectacles S include a frontal visor V having left and right arms $A_L$ and $A_R$ that attach by means of hinges h to left and right handles $H_L$, $H_R$. The left and right handles $H_L$, $H_R$ connect to temples T for engaging the temple and ear of the wearer. A pair of laterally spaced left and right prismatic elements $P_L$ and $P_R$ are attached to the lower surface $V_{LS}$ of the visor V. As shown in FIG. 2, the visor V is oriented with an angle of declination with respect to the handle H of between approximately 5 and 15 degrees (i.e., the visor V is inclined with respect to the handles $H_L$, $H_R$). A visor side panel VSP extends downwardly from the visor V on either side, thereby blocking the outer sides of the prisms.

Referring to FIG. 2, the temples T are of conventional eyewear construction and connect to the horizontally extending handles $H_L$, $H_R$ on one end and terminate with downwardly curved ends $C_e$ on the other end for engaging the ear area of the wearer. The inner frontal end of each handle $H_L$, $H_R$ connects to a hinge section $H_S$ which provides the structure for the hinge h. The hinge h features a conventional pin for pivotal movement about a vertical axis between the illustrated wearing position and a collapsed position wherein the temples abut the rear arms of the visor.

Figure 3:
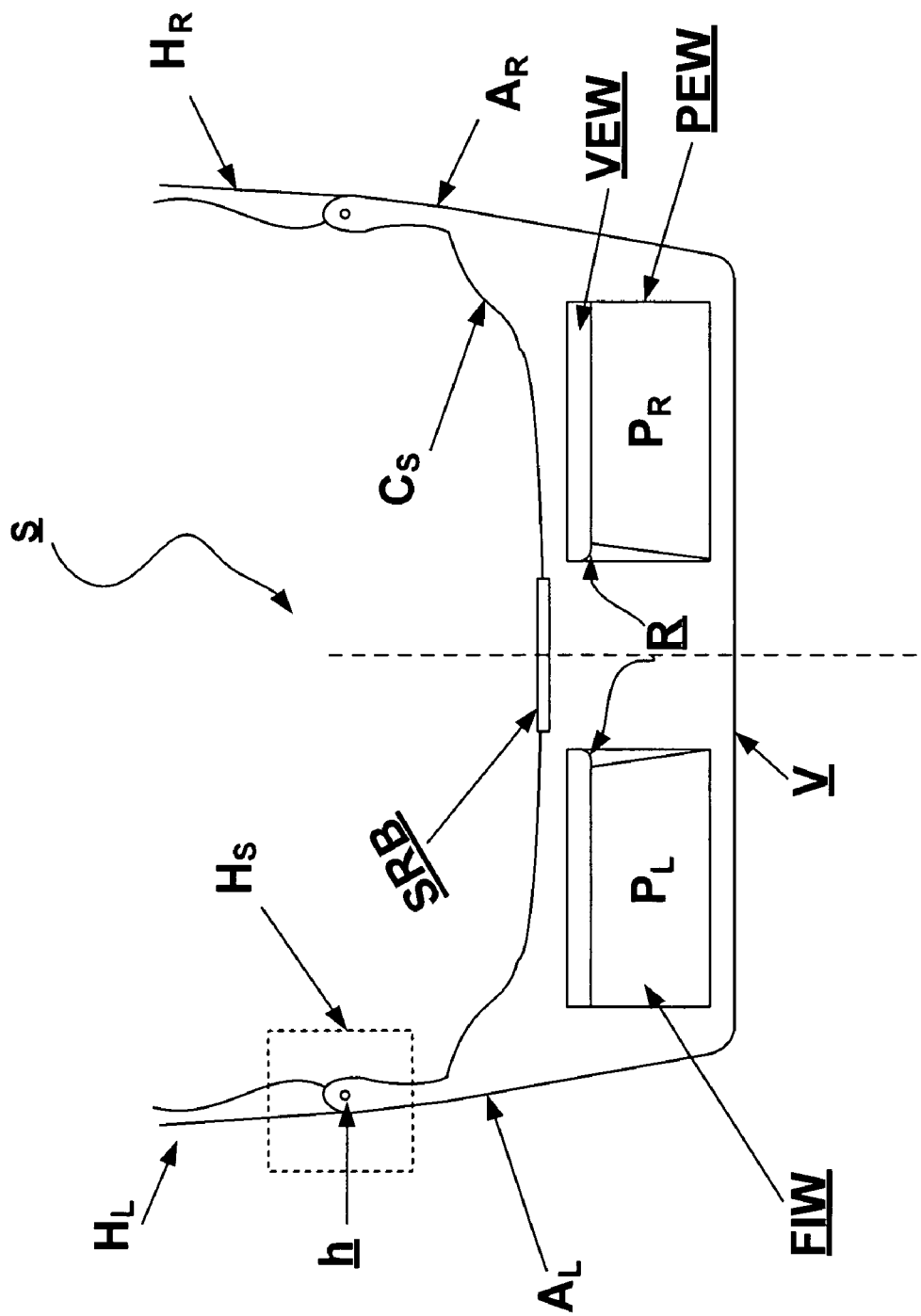
FIG. 3 is a bottom view of the spectacles.
Figure 4:
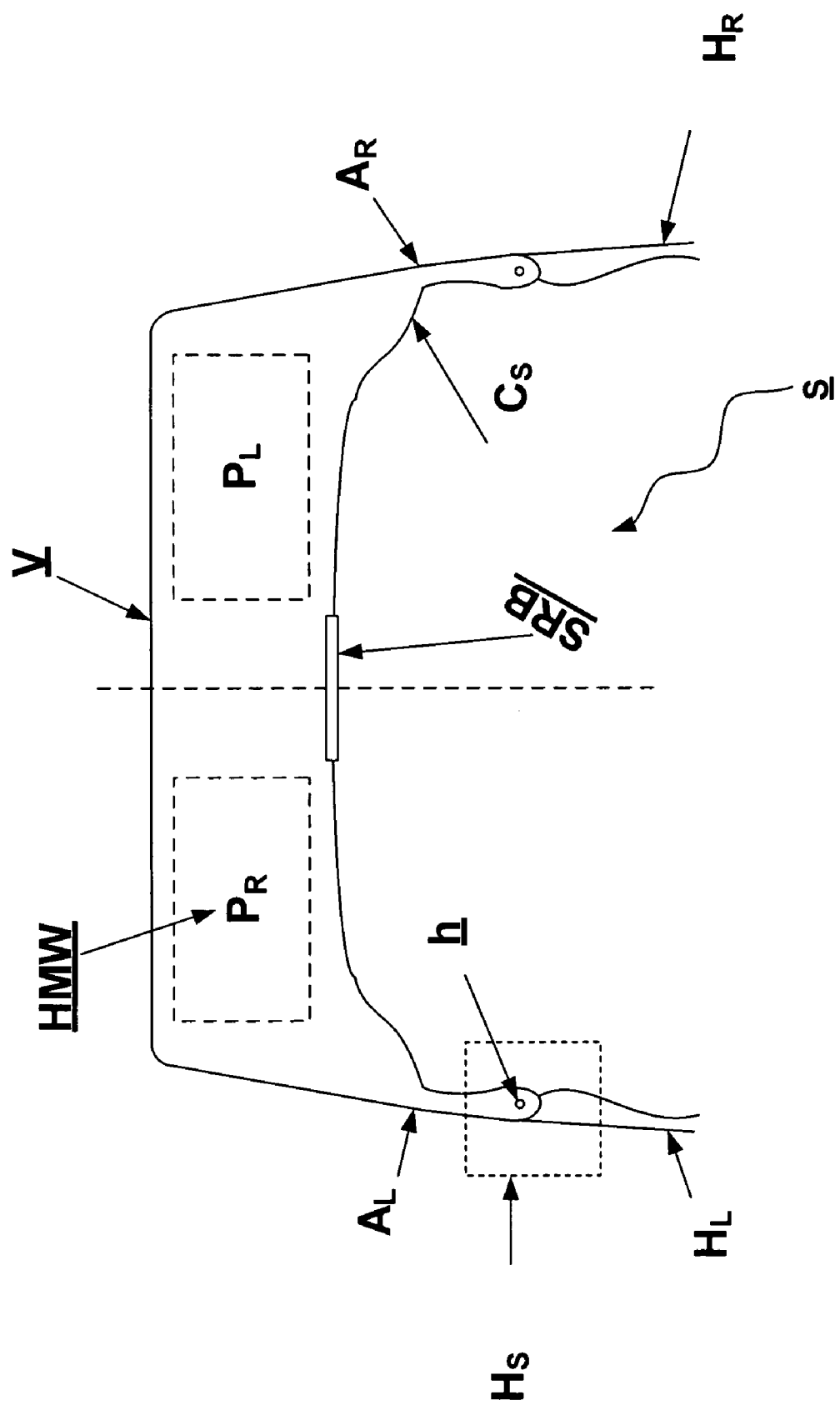
FIG. 4 is a is a top view of the spectacles.

As illustrated in FIGS. 3 and 4, the visor V is configured with an inner edge profile that permits the spectacles S to be supported on the wearer's forehead. A soft rubber bridge SRB is connected to the visor V between the prismatic elements on the rear edge of the visor V. The soft rubber bridge SRB can be made from silicone, rubber foam, plastic or soft rubber, is centered on the inside surface of the visor V, and is sized and configured to register with the forehead between the eyebrows and the nose bridge of the wearer.

Figure 5:
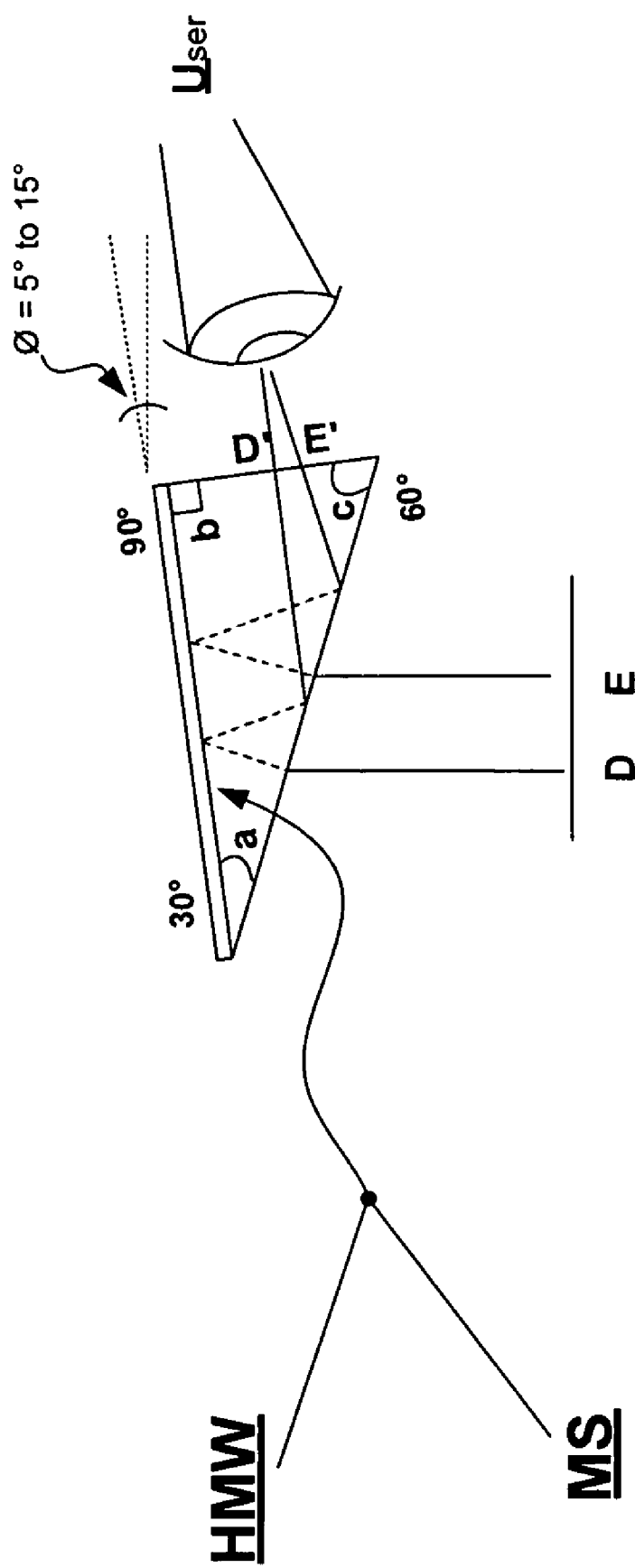
FIG. 5 is a vertical schematic view of the redirected field of view provided by the spectacles of FIG. 1.
Figure 6:
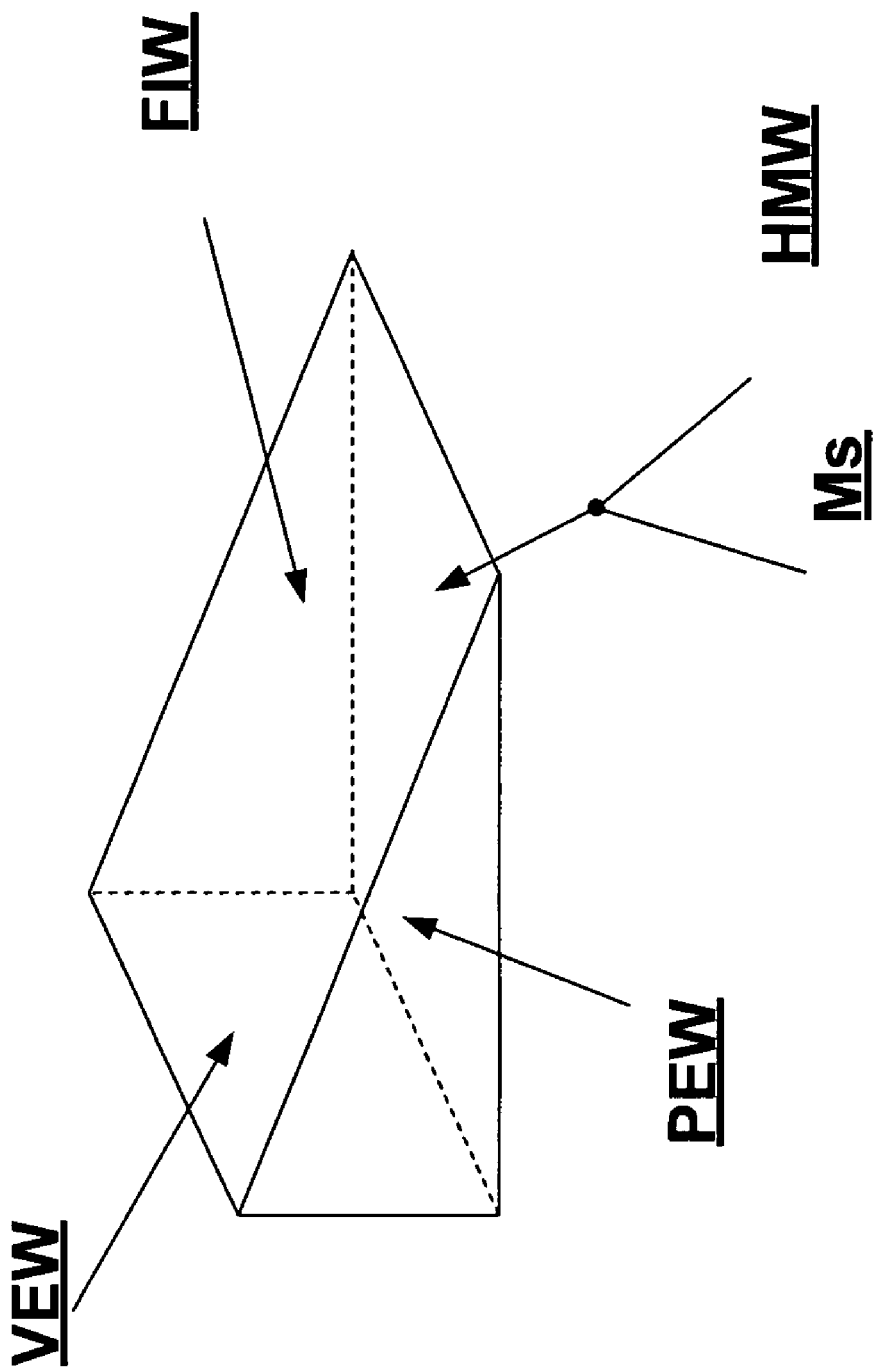
FIG. 6 is a cross sectional view of the pentahedral shape, triangular prism.

Referring to FIG. 3 and 6, the prisms $P_L$, $P_R$ are symmetrically disposed on the lower surface of the visor V. The prisms $P_L$, $P_R$ may be made of optical grade glass, clear resin or thermoplastics, and are heptahedral in shape with a side view shape defining a right-triangle, with a parallel end walls PEW, a vertical end wall VEW, a horizontal mounting wall HMW, and a frontal inclined wall FIW. The horizontal mounting wall HMW of each prism $P_L$, $P_R$ is adhered to the lower surface $V_{LS}$ of the visor V by a suitable adhesive as illustrated in FIG. 4. The prisms $P_L$, $P_R$ are mounted on the visor V and sized so that the eyes of the wearer are directed on the vertical end wall VEW for normal forward vision with a slight downward inclination as defined by the angle of declination, as shown in FIG. 5.

The visor V, SRB and the temples are positioned at the normal vertical cutoff and thus disposed outwardly of the field of view. Such disposition also allows the spectacles to be conveniently worn over conventional glasses. The prisms $P_L$, $P_R$ are spaced sufficiently close together and have sufficient width (see FIG. 7A) to provide continuous binocular viewing with a panoramic view and without blind spots or other discontinuities. The width of the vertical end wall VEW is designed to accommodate most variations of inter-ocular distances.

Referring to FIGS. 5 and 6, the prisms $P_L$, $P_R$ function in a well known manner to reflect and refract images. In the present invention, the end walls PEW of the prisms $P_L$, $P_R$ are coated with black or opaque material to be non-reflective and non translucent. Additionally, the vertical side panel VSP extending down from the visor V blocks light from entering the outer sides of the prisms $P_L$, $P_R$. The painted or frosted surfaces and the vertical side panel VSP are provided so secondary images and light are not transmitted into the prisms $P_L$, $P_R$ which could result in discernable visible false images and distracting lights.

The vertical end wall VEW of the prisms $P_L$, $P_R$ have a clear polished surface and is located in the wearer's direct line-of-sight. The horizontal mounting wall HMW of the prisms $P_L$, $P_R$ has a mirrored surface MS, preferably silvered or otherwise reflectively coated. The forward inclined wall FIW of the prisms $P_L$, $P_R$ features a clear polished surface and receives the images reflected by the surface MS for internal reflection to the front wall surface and refraction to the wearer. It will be appreciated that the prisms are effective for providing a redirected field of vision DE, substantially normal to the line-of-sight D'E', as prescribed by the angularities between the prism walls. Various angularities may be adopted for accomplishing the foregoing. In the preferred embodiment, a substantially perpendicular redirection of vision is provided, with the angle of vision redirection being measured from the plane defined by the left and right handles $H_L$, $H_R$. In the preferred embodiment, the prisms have interior angles of approximately 90° for angle b, approximately 60° for angle c and approximately 30° for angle a as illustrated in FIG. 5.

The size of the prisms $P_L$, $P_R$, particularly their width, are set to ensure a wide field of view that is consistent with a wearer's normal perspective. As illustrated in FIG. 7A, the visor V has a width of approximately 50 mm on the top surface, and the two prisms $P_L$, $P_R$ each have a width of approximately 38 mm. The prisms $P_L$, $P_R$ are each displaced approximately 14 mm from the centerline of the visor V. So positioned, the prisms $P_L$, $P_R$ fill much of the wearer's forward vision, and are wide enough to provide a comfortable left-right panoramic view.

Representative dimension of the prisms $P_L$, $P_R$ are illustrated in FIG. 7C. Specifically, the prisms $P_L$, $P_R$ have a width of approximately 38 mm, a height of approximately 19 mm, a base of approximately 31 mm, and a hypotenuse of approximately 39 mm.

Figure 1:
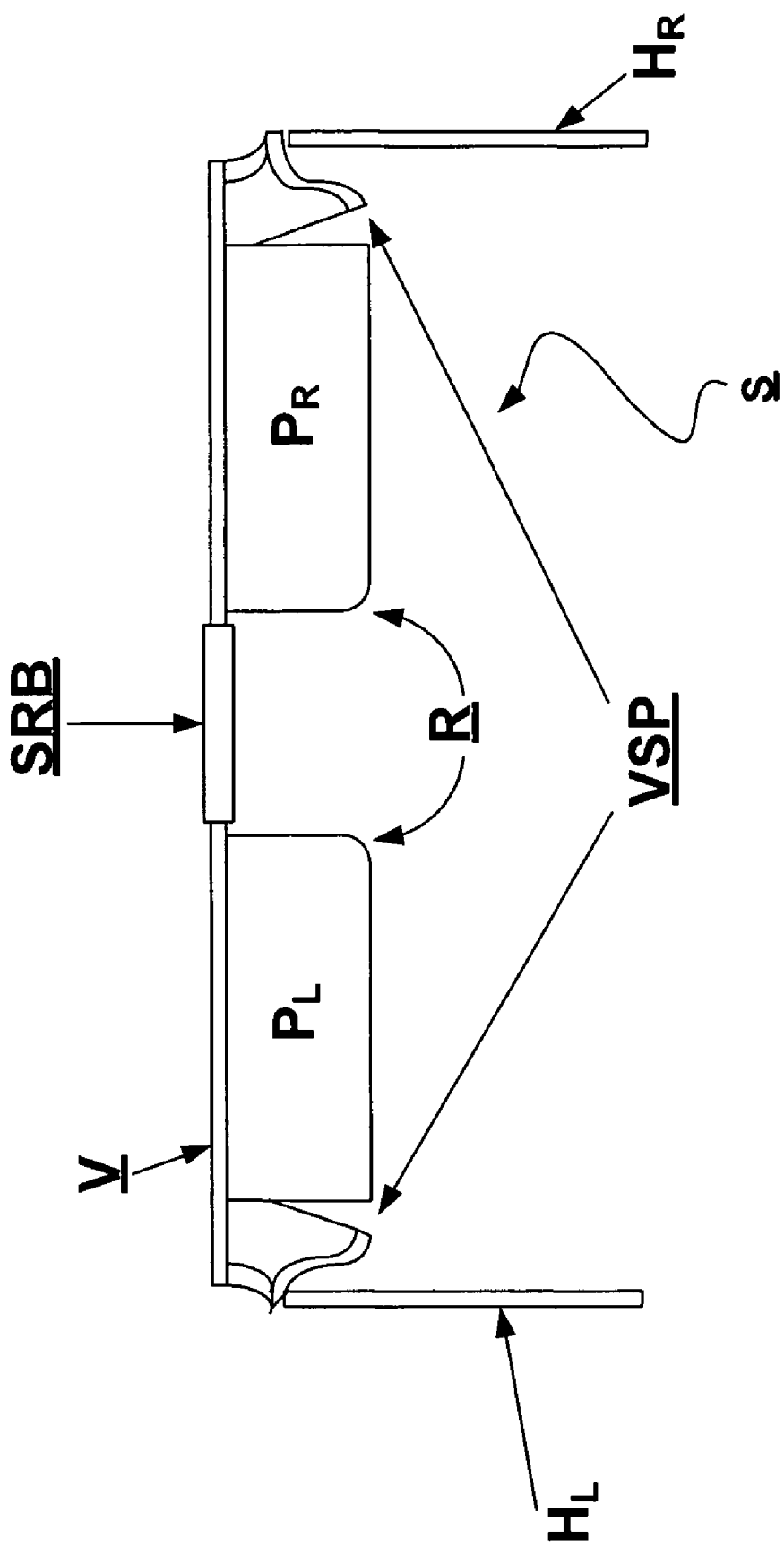
FIG. 1 is a front elevational view of an embodiment of spectacles for providing the wearer with a redirected field of view in accordance with a preferred targeted view.

As illustrated in FIG. 1, the inner lower corner of each prism $P_L$, $P_R$ is provided with a radius R. This radius R serves two functions. First, the radius R provides additional space between the wearer's nose and the prisms $P_L$, $P_R$ while permitting the prisms to extend close together. Positioning the prisms $P_L$, $P_R$ close together provides a wider panoramic view, thereby improving the wearer's vision and comfort. To allow this close spacing while providing a universal fit on most noses, the portion of the lower inside corner of the prisms $P_L$, $P_R$ (where the wearer does not have normal vision) is removed to provide the radius R. The second function of the radius R is to prevent injury to the wearer that could occur if the inner lower corner of the prisms $P_L$, $P_R$ was sharp. The radius R at the lower right corner of PL and the lower left corner of PR, located on the VEW, prevents puncture of skin should the prism accidentally come in contact with the nose.

As illustrated in FIG. 7B, the vertical side panel VSP extends along the length of the visor (approximately 50 mm) and has a length of approximately 38 mm and a height of approximately 22 mm.

As mentioned above and illustrated in FIGS. 2, 4 and 5, the visor's lower surface VLS is inclined below the horizontal plane as defined by the handles by an angle between approximately 5 and 15 degrees (referred to herein as an angle of declination). This angle of declination positions the prisms at an optimal angle for viewing by a wearer that helps the wearer find the desired redirected scene without hunting for it within the wearer's field of vision. Additionally, this angle reduces the height of the prism (i.e., reduces angle "a" in FIG. 5) that is necessary to achieve 90 degree angle of viewing redirection, thereby reducing the size and weight of the prisms. As used herein, the angle of redirection refers to the angle between the horizontal plane defined by the handles and the resulting line of sight, as illustrated in FIG. 5. This declination of the visor and viewing prisms is not disclosed in the prior designs discussed in the Background section, since those references taught that the top surface of the prisms should be maintain parallel to the handle. The inventor has determined that presenting the prisms at an angle of declination of between approximately 5 and 15 degrees results in more comfortable viewing due to the relaxed position of the eyes. Additionally, the angle of declination in combination with the vision-blocking effect of the visor helps to fill the field of vision of the wearer along the wearer's vertical axis, which reduces distractions from images below the prism without increasing the size of the prism. These various effects from the angle of declination combine to provide the wearer with a comfortable and easy viewing capability.

Referring to FIG. 7A, the width of the prisms presents the redirected field of view to the wearer without the need to hunt for the image, thus preventing wearer fatigue. In addition, it provides the wearer with an easy viewing experience, giving the wearer the feel and perception of a panoramic view.

Figure 8:
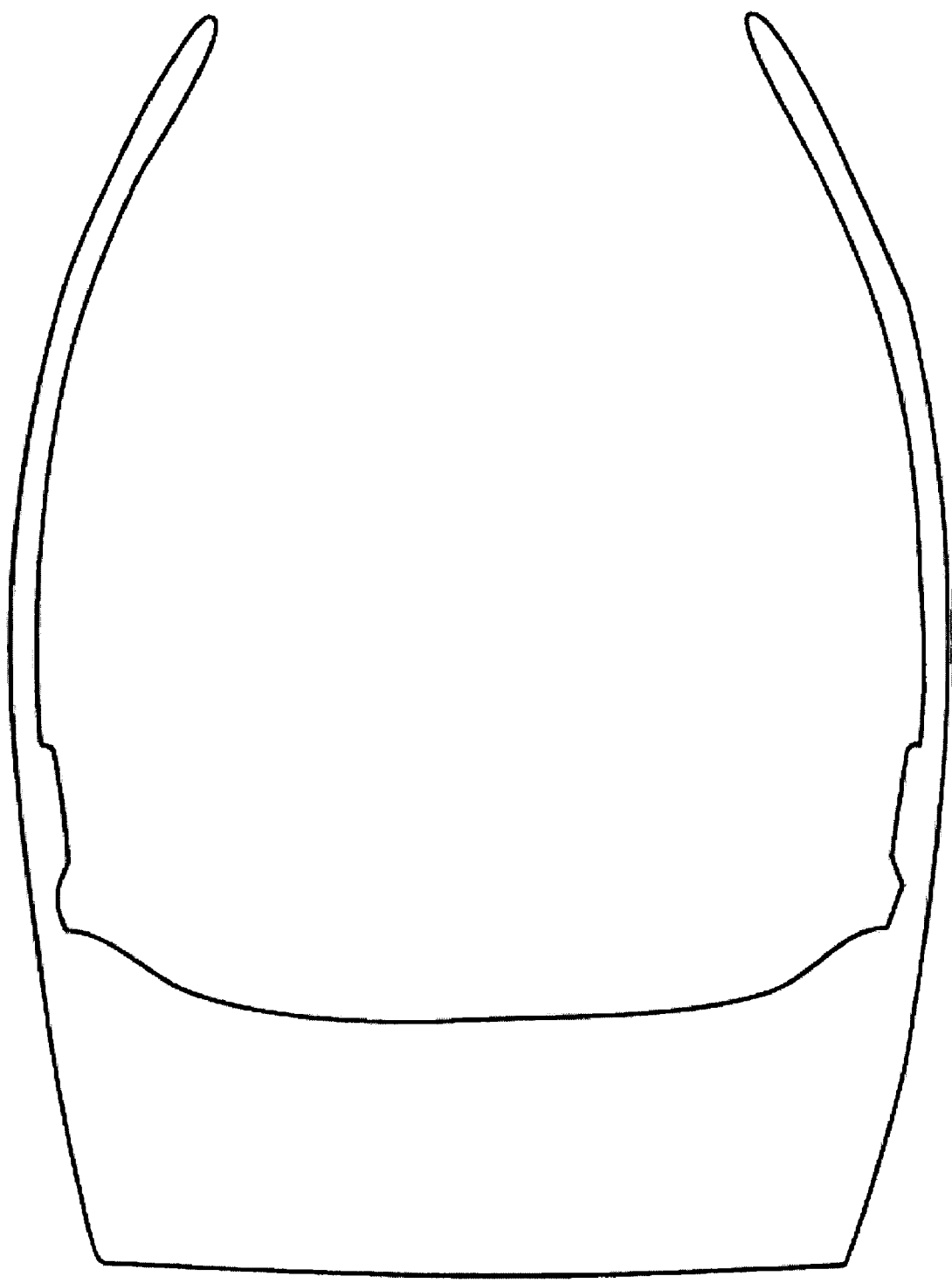
FIG. 8 shows the entire top view profile of an embodiment of the spectacles.

FIG. 8 shows a top perspective view of the entire spectacles. As illustrated, the handles $H_L$, $H_R$ and the temples T may be formed with an inward curvature to fit the contours of the wearer's head, while the inner edge of the visor V is curved to approximate the profile of the wearer's forehead.

The eyewear constructed in accordance with the foregoing description present a redirected view to a wearer. In particular, the angle of declination of the visor V and the depending prisms $P_L$, $P_R$, combined with the width of the prisms $P_L$, $P_R$, are such that the redirected view is presented within the wearer's normal field of view, providing a panoramic view. As a result there is reducing wearer fatigue. The vertical side panel VSP on both sides of the prisms $P_L$, $P_R$ blocks a forward portion of normal peripheral vision of the wearer thereby removing distracting images of scenery that is not rotated by 60-120 degrees, which can cause difficulty in focusing on the object of interest. The soft rubber bridge SRB on the inside edge of the visor V spreads the weight of the spectacles over the wearer's forehead, further increasing the wearer's comfort. The soft rubber bridge SRB, in combination with the entire shape of the spectacles, positions the visor and the prisms away from the brow line of a wearer allowing for the spectacles to lay over most conventional prescription or sun glasses eyewear.

Since users may wear the eyewear constructed in accordance with the foregoing embodiment outside or in brightly lit areas, tinted lenses may be included with the eyewear. Also, some users may need to wear vision correcting lenses along with the redirected viewing eyewear. As described above, users can wear sunglasses or corrective eyewear in conjunction with the spectacles to address these needs. To accommodate these needs without requiring users to wear the spectacles over other eyewear, the various embodiments include supplemental lenses that are removably attached to the visor or prisms. Supplemental lenses may be tinted, vision correcting (referred to as "corrective") or both tinted and vision correcting, and therefore are referred to collectively herein as being tinted and/or corrective lenses. A variety of embodiments may be used to connect tinted and/or corrective lenses to the spectacles.

Figure 9A:
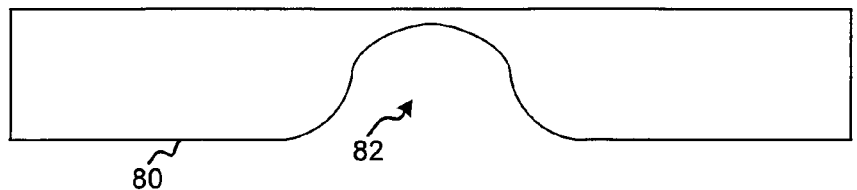
FIGS. 9A-9D are perspective views of an embodiment of tinted and/or corrective lenses for use with the spectacles.
Figure 9B:
Figure 9C:
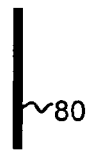
Figure 9D:
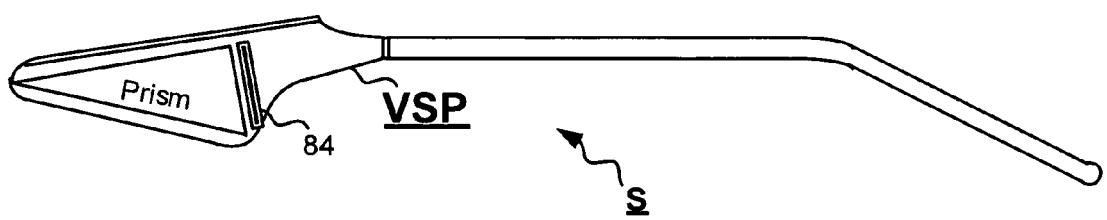

A simple embodiment for attaching tinted and/or corrective lenses to the spectacles is illustrated in FIGS. 9A-9D. FIGS. 9A, 9B and 9C illustrate front, top and side edge views, respectively, of the tinted and/or corrective lenses, and FIG. 9D shows a side view of the spectacles S including a prism and one visor side panel VSP, according to this embodiment. In this embodiment, the replaceable lenses 80 are configured as a single planar member having a long axis length approximately equal to the distance separating the left and right visors side panels VSP on the spectacles S. A groove 84 provided in the visor side panel VSP on each side of the spectacles S provides a slot into which the lenses 80 can fit. When positioned in the groove 84, the lenses 80 are positioned in front of the prisms so that the user's vision passes through the lenses 80. A cutout region 82 is provided in the lenses 80 to accommodate a user's nose. The lenses 80 may be manufactured from glass or transparent plastic with sufficient rigidity to remain in place on the spectacles S when inserted into the slot 84.

Figure 10F:
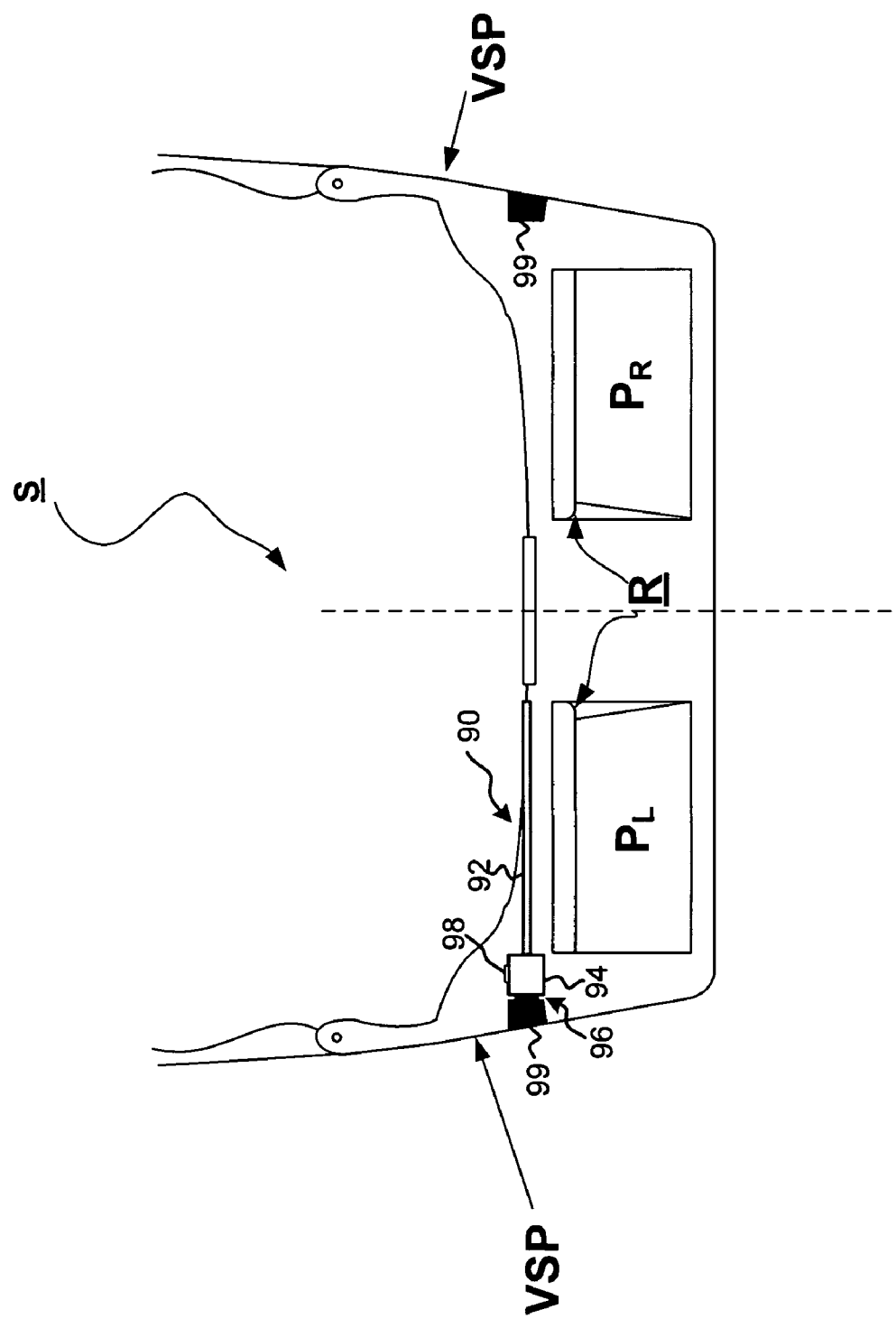

Another embodiment for attaching tinted and/or corrective lenses to the spectacles S is illustrated in FIGS. 10A through 10F. FIGS. 10A, 10B, 10C, 10D and 10E illustrate right front, left front, top, inner side and outer side edge views, respectively, of the tinted and/or corrective lenses 90, 91, and FIG. 10F shows a bottom view of the spectacles S showing one lens assembly 90 attached to a visor side panel VSP, according to this embodiment. In this embodiment, a single lens assembly 90, 91 is provided for each eye. To attach each lens assembly 90, 91 to the spectacles S, magnets 96 are coupled to one side of the lens assembly which can magnetically attach to complementary magnets 99 coupled to the visor side panel VSP as shown in FIG. 10F.

Each lens assembly 90, 91 includes a lens 92 coupled to a support member 94, such as by means of fasteners 98. The lens 92 may feature a radius 93 so that when positioned on the visor S the lens 92 spans the width of one prism but does not contact a user's nose. Magnets 96 are attached to the support member 94 by adhesives, captured by the support member 94 or integral parts of the support member 94. While FIGS. 10A-10E show two magnets 96 per lens 92, one, three or more magnets 96 may be employed. While FIGS. 10A-10E illustrate the fasteners 98 as being threaded fasteners, any form of fastener may be used to couple the lens 92 to the support member 94, including adhesives. Additionally, the support member 94 need not be a separate member, and instead may be a thick portion of an integral lens/support member that provides sufficient surface area for attaching the magnets 96.

This embodiment enables users to attached different tinted and/or corrective lenses for each eye. In this matter, users can adjust the tint applied to each eye, or choose corrective lenses appropriate for each eye from a stock of standard correction lenses.

Figure 11E:
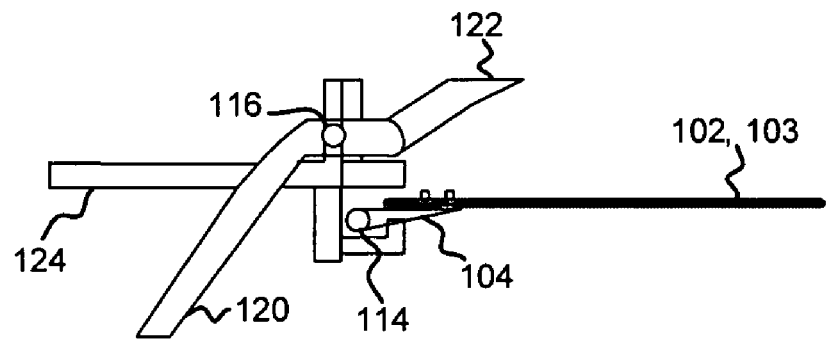
Figure 11F:
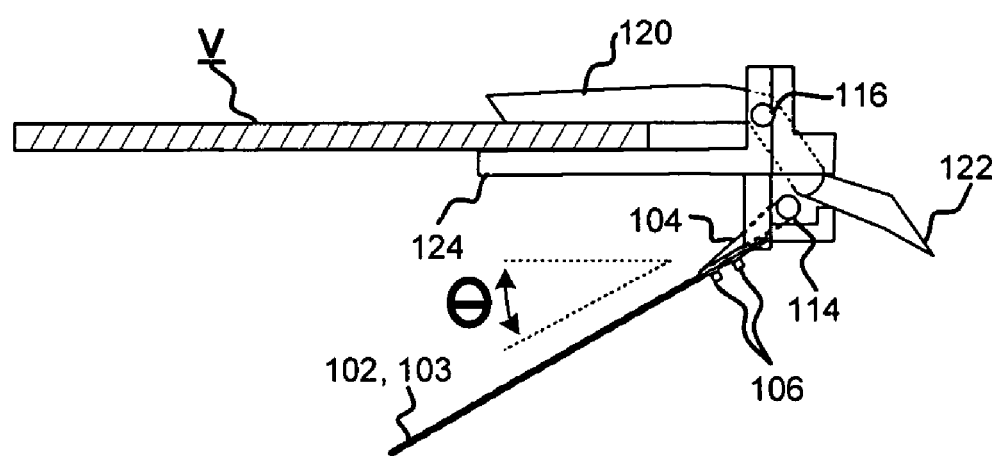

In another embodiment, tinted and/or corrective lenses may be coupled to the visor V by a spring-loaded clip as illustrated in FIGS. 11A-10G. FIGS. 11A, 11B, 11C, 11D and 11E illustrate front, rear, top, bottom and side views, respectively, of this embodiment. FIG. 11F shows this embodiment positioned on a visor V of the spectacles. In this embodiment, lenses 102, 103 are connected to a spring clip assembly 110 by a lens support 104. The lens support 104 may be a wire or a metal or plastic structure which couples to each lens 102, 103 by fasteners 106. The fasteners 106 may be mechanical fasteners or adhesives.

In an embodiment, the spring clip assembly 110 features a pair of spring-loaded substantially linear arms 120 which together with a pair of fixed substantially linear arms 124 can engage the visor V in order to attach the assembly to the spectacles. The spring-loaded arms 120 are rotateably coupled to the support structure 112 by a hinge 116 that is spring-loaded by springs 118 anchored in the support structure 112. A tab 122 coupled to the spring-loaded arms 120 is configured so that when depressed, as illustrated in FIG. 11F, the arms 120 are pivoted about the hinge 116 in order to engage the visor V.

The fixed arms 124 and hinge 116 are supported by or part of a support structure 112. In one embodiment, the fixed arms are fixedly coupled to the support structure 112, such as by fasteners or adhesives. In another embodiment, the fixed arms are fixedly coupled to the support structure as unitary parts of the structure.

In an embodiment, the lens support 104 may be coupled to the support structure 112 by a second hinge 114 so that the lenses 102, 103 can pivot into the viewing path of the spectacles. So configured, the lenses 102, 103 may be pivoted to a first position, such as illustrated in FIG. 11E, so that the user's vision does not pass through the lenses. When pivoted to a second position, such as illustrated in FIG. 11F, the lenses 102, 103 intersect the user's vision path, thereby providing the benefit of tinting and/or corrective refraction. In order to intersect the user's vision path, the lenses 102, 103 should pivot about the hinge 114 so that they form an acute angle θ with respect to the visor V. This acute angle θ may be similar to the angle between the visor V and the bottom surface of the prism. In this position, the lenses 102, 103 may be approximately parallel to a surface of the prisms.

While FIG. 11E shows the lenses 102, 103 in a position roughly parallel with the plane of the visor V, the first position may be at a different angle, such as at a right angle to the visor V, that does not intersect the user's vision path. In an embodiment, the lenses 102, 103 may pivot around the hinge 114 so as to fold back over the top of the visor V.

Figure 11G:
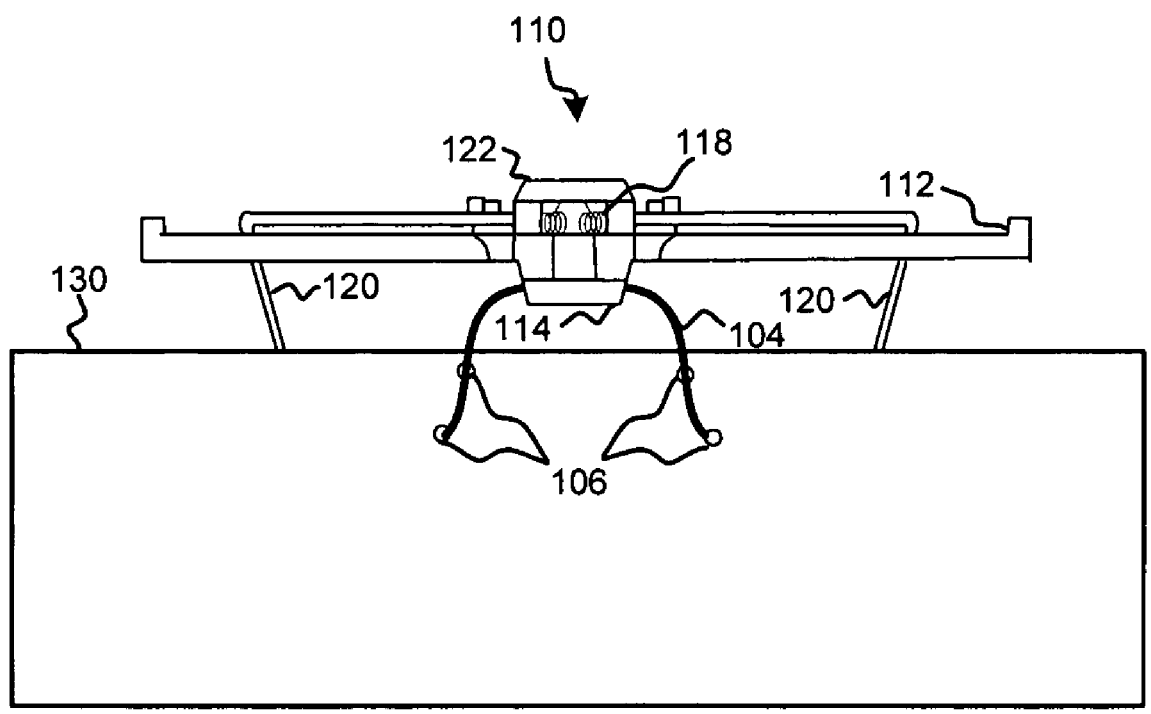

While FIGS. 11A-11D show two lenses 102, 103, in an embodiment shown in FIG. 11G the lenses may be configured as a single lens 130 that approximately spans the width of the visor V.

Figure 12A:
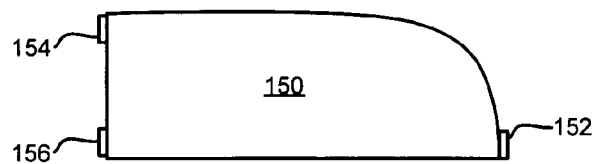
FIGS. 12A-12D are perspective views of another embodiment of tinted and/or corrective lenses for use with the spectacles.
Figure 12B:
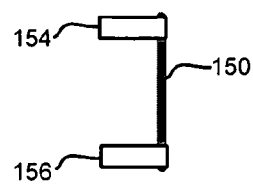
Figure 12C:
Figure 12D:
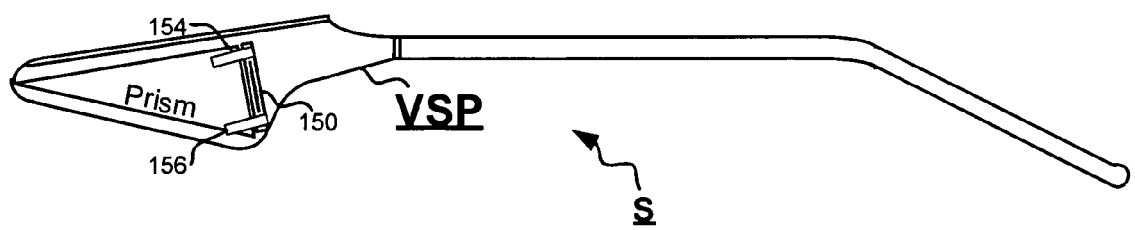

A tinted and/or corrective lens may also be attached directly to each prism as illustrated in FIGS. 12A through 12D. FIGS. 12A, 12B and 12C illustrate front, side edge and perspective views, respectively, of a tinted and/or corrective lens 150, and FIG. 12D shows a side view of the spectacles S including a prism with a lens 150 attached, all according to this embodiment. In this embodiment, each lens 150 includes a plurality tangs 152, 154, 156 which are configured to slip over a prism in order to hold the lens 150 in place. Each tang 152, 154, 156 may be made from metal or plastic and are configured to apply sufficient pressure to the prism to hold the lens 150 in place. While FIGS. 12A, 12B and 12C showed this embodiment as including three tangs 152, 154, 156, more or fewer tangs may be used. In a similar embodiment, a portion or all of the periphery of the lens 150 may be coupled to a thin band (e.g., a metal or plastic band) which is shaped to match the shape of a prism with sufficient width to slip over all or a portion of the periphery of the prism. In this embodiment, each lens 150 is held in place by lateral force applied by the tang 152, 154, 156 and friction between the tangs (or encircling band) and the prism.

While the present invention has been disclosed with reference to certain exemplary embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

I claim:

1. Eyewear for providing a redirected field of vision, comprising:
    a visor coupled to a pair of handles each coupled to a curved temple, the visor having a lower surface, an inner edge and two side edges;
    a pair of triangular optical prisms each having a top surface, an inner side, and an outer side, wherein
        the prisms are coupled on their top surface to the lower surface of the visor positioned approximately 14 mm apart,
        the top surface of each prism is a mirrored surface,
        an opaque coating is applied on the inner side of each prism, and
        each prism has a radius portion on a lower inside corner;
    two vertical side panels coupled to the visor one on each side edge, the vertical side panels sized to reduce light entering into the outer side of each of the pair of prisms;
    a soft rubber bridge coupled to the inner edge of the visor; and tinted and/or corrective lenses positioned in front of one face of the prism,
    wherein the visor is angled downward from the handles with an angle of declination between approximately 5 degrees and approximately 15 degrees.

2. The eyewear according to claim 1, wherein the tinted and/or corrective lenses are conventional eyewear worn in conjunction with the visor.

3. The eyewear according to claim 1, wherein:
    the tinted and/or corrective lenses comprise a transparent planar member having a long axis length approximately equal to a distance separating the two vertical side panels; and
    the two vertical side panels include a groove configured to accept the tinted and/or corrective lenses.

4. The eyewear according to claim 1, wherein:
the two vertical side panels include a first magnet coupled to an inside surface; and
the tinted and/or corrective lenses comprise:
- a lens;
- a support member coupled to the lens; and
- a second magnet coupled to the support member, the second magnet configured to magnetically attract an exposed surface of the first magnet so as to hold the lens in position adjacent to a surface of one of the prisms.

5. The eyewear according to claim 1, wherein:
the tinted and/or corrective lenses comprise:
- a spring clip assembly including
  - a support structure having a first hinge and second hinge,
  - a first pair of substantially linear arms fixedly coupled to the support structure,
  - a second pair of substantially linear arms rotateably coupled to the support structure by the first hinge and a spring; and
  - a lens rotateably coupled to the support structure by a lens support coupled to the second hinge,
- wherein the support structure, the first pair of substantially linear arms, the second pair of substantially linear arms, the first hinge and the spring are configured to engage the visor and position the lens in front of the prisms.

6. The eyewear according to claim 5, wherein the support structure and second hinge are configured so the lens can be positioned at an acute angle with respect to a top surface of the visor in order to intersect a vision path through the prisms.

7. The eyewear according to claim 1, wherein:
the tinted and/or corrective lenses comprise:
- a spring clip assembly including
  - a support structure having a first hinge and second hinge,
  - a first pair of substantially linear arms fixedly coupled to the support structure,
  - a second pair of substantially linear arms rotateably coupled to the support structure by the first hinge and a spring; and
  - a pair of lenses rotateably coupled to the support structure by a lens support coupled to the second hinge,
- wherein the support structure, the first pair of substantially linear arms, the second pair of substantially linear arms, the first hinge and the spring are configured to engage the visor and position the pair of lenses in front of the prisms.

8. The eyewear according to claim 6, wherein the support structure and second hinge are configured so the pair of lenses can be positioned at an acute angle with respect to a top surface of the visor in order to intersect a vision path through the prisms.

9. The eyewear according to claim 1, wherein the tinted and/or corrective lenses comprise:
- a lens; and
- a plurality of tangs coupled to the lens,
- wherein the tangs are configured to engage one of the prisms so as to hold the lens in position in front of a surface of the one prism.

\* \* \* \* \*